US012804613B2

(12) United States Patent
Zheng et al.

(10) Patent No.: US 12,804,613 B2
(45) Date of Patent: Nov. 17, 2026

(54) DATA TRANSMISSION METHOD AND UE

(71) Applicant: VIVO MOBILE COMMUNICATION CO., LTD., Dongguan (CN)

(72) Inventors: Qian Zheng, Dongguan (CN); Jiamin Liu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 275 days.

(21) Appl. No.: 18/598,193

(22) Filed: Mar. 7, 2024

(65) Prior Publication Data

US 2024/0214991 A1 Jun. 27, 2024

Related U.S. Application Data

(63) Continuation of application No. PCT/CN2022/117794, filed on Sep. 8, 2022.

(30) Foreign Application Priority Data

Sep. 13, 2021 (CN) ......................... 202111069375.X

(51) Int. Cl.

| | |
|---|---|
| ***H04W 72/02*** | (2009.01) |
| ***H04W 72/1273*** | (2023.01) |
| ***H04W 72/566*** | (2023.01) |

(52) U.S. Cl.

CPC ....... *H04W 72/02* (2013.01); *H04W 72/1273* (2013.01); *H04W 72/569* (2023.01)

(58) Field of Classification Search

CPC H04W 72/02; H04W 72/1273; H04W 72/569
See application file for complete search history.

(56) References Cited

U.S. PATENT DOCUMENTS

| | | | |
|---|---|---|---|
| 2019/0149365 A1 | 5/2019 | Chatterjee et al. | |
| 2021/0168814 A1 | 6/2021 | Chen et al. | |
| 2021/0211239 A1* | 7/2021 | Fan | H04L 49/9057 |

FOREIGN PATENT DOCUMENTS

| | | | |
|---|---|---|---|
| CN | 112822778 A | 5/2021 | |
| WO | 2020092742 A1 | 5/2020 | |
| WO | WO-2022031921 A1 * | 2/2022 | H04W 72/02 |

OTHER PUBLICATIONS

"Discovery procedure for Sidelink relay", 3GPP RAN WG2 Meeting #113-e, R2-2100522, Jan. 25-Feb. 5, 2021, 6 pages.
"Discovery procedure for SL relay", 3GPP RAN WG2 Meeting #111-e, R2-2006761, Aug. 17-Aug. 28, 2020, 4 pages.
"Further discussion on relay discovery", 3GPP TSG-RAN WG2 Meeting #115, R2-2108143, Aug. 2021, 5 pages.
"Remaining issues on relay discovery", 3GPP TSG RAN WG2 Meeting #114-e, R2-2104736, May 19-21, 2021, 9 pages.
"Summary of 8.7.2 relay discovery", 3GPP TSG-RAN WG2 Meeting #113bis-e, R2-2104297, Apr. 12-Apr. 20, 2021, 17 pages.

(Continued)

*Primary Examiner* — Mohammad S Anwar
(74) *Attorney, Agent, or Firm* — The Webb Law Firm

(57) ABSTRACT

A data transmission method includes performing, by a UE, a multiplexing operation on to-be-transmitted data according to a data parameter of the to-be-transmitted data; where the to-be-transmitted data includes at least a first type of data or a second type of data; and the first type of data is data for sidelink SL discovery, and the second type of data is data for non-SL discovery.

14 Claims, 4 Drawing Sheets

(56) References Cited

OTHER PUBLICATIONS

CATT, "[AT115-e][617][Relay] Continuation of discussion on discovery (CATT)", 3GPP TSG RAN WG2 Meeting #115- e, Electronic Meeting, Aug. 16-27, 2021, R2-2108949.
Mediatek Inc., "Remaining issues of Relay Discovery", 3GPP TSG-RAN WG2 Meeting #116 electronic, Online, Nov. 1-12, 2021, R2-2110271.
Qualcomm Incorporated, "Remaining issues of relay discovery", 3GPP TSG-RAN WG2 Meeting #115-e, E-Conference, Aug. 9-27, 2021, R2-2107089.
Ericsson, "Introduction of further enhancements for eMTC", 3GPP TSG-RAN WG2 Meeting #109-e, Electronic meeting, Feb. 24-Mar. 6, 2020, R2-2001872.
Huawei et al., "Remaining issue on relay discovery", 3GPP TSG-RAN WG2 Meeting #115 electronic, Online, Aug. 9-27, 2021, R2-2108626.
Samsung Electronics, "Resource allocation for SL discovery message", 3GPP TSG-RAN WG2 #115-e, Online, Aug. 9-27, 2021, R2-2107713.

* cited by examiner

DATA TRANSMISSION METHOD AND UE

CROSS-REFERENCE TO RELATED APPLICATIONS

This application is a Bypass Continuation Application of International Patent Application No. PCT/CN2022/117794 filed Sep. 8, 2022, and claims priority to Chinese Patent Application No. 202111069375.X filed Sep. 13, 2021, the disclosures of which are hereby incorporated by reference in their entireties.

BACKGROUND OF THE INVENTION

Field of the Invention

This application pertains to the field of communication technologies, and in particular, relates to a data transmission method and a user equipment (UE).

Description of Related Art

In an NR system, if sidelink SL discovery transmission is to be performed, multiplexing in NR SL communication (for example, a physical sidelink share channel (PSSCH)) is required for the SL discovery, with no dedicated physical channel introduced. However, the multiplexing rules for SL discovery have not been standardized. For example, whether SL discovery and non-SL discovery types of data (for example, SL communication data, PC5 radio resource control (RRC), and SL MAC CE) are multiplexed in one TB or different TBs for transmission.

SUMMARY OF THE INVENTION

According to a first aspect of the embodiments of the present application, a data transmission method is provided, including: performing, by a user equipment UE, a multiplexing operation on to-be-transmitted data according to a data parameter of the to-be-transmitted data; where the to-be-transmitted data includes at least one of following: a first type of data or a second type of data, the first type of data being data for sidelink SL discovery, and the second type of data being data for non-SL discovery.

According to a second aspect of the embodiments of the present application, a data transmission apparatus is provided, including: an execution module configured to perform a multiplexing operation on to-be-transmitted data according to a data parameter of the to-be-transmitted data; where the to-be-transmitted data includes at least one of following: a first type of data or a second type of data, the first type of data being data for sidelink SL discovery, and the second type of data being data for non-SL discovery.

According to a third aspect of the embodiments of the present application, a UE is provided. The UE includes a processor, a memory, and a program or instructions stored in the memory and executable on the processor, wherein when the program or the instructions are executed by the processor, steps of the data transmission method according to the first aspect are implemented.

According to a fourth aspect of the embodiments of the present application, a non-transitory readable storage medium is provided. The non-transitory readable storage medium stores a program or instructions, and when the program or the instructions are executed by a processor, steps of the data transmission method according to the first aspect are implemented.

According to a fifth aspect of the embodiments of the present application, a data transmission apparatus is provided, configured to perform steps of the data transmission method according to the first aspect are implemented.

According to a sixth aspect of the embodiments of the present application, a UE is provided, including a processor and configured to perform steps of the data transmission method according to the first aspect are implemented.

According to a seventh aspect of the embodiments of the present application, a chip is provided, the chip includes a processor and a communication interface, the communication interface is coupled to the processor, and the processor is configured to run a program or instructions so as to implement steps of the data transmission method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It is worth noting that the technology described in the embodiments of this application is not limited to long term evolution (LTE)/LTE-Advanced (LTE-A) systems, but may also be used in other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for illustration purposes, NR terms are used in most of the following descriptions, and these technologies may also be applied to other applications than the NR system application, for example, the 6th generation (6G) communication system.

Figure 1:
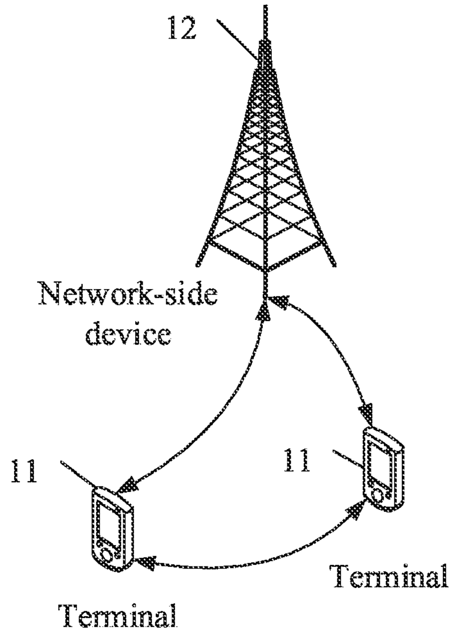
FIG. 1 is a schematic diagram of an architecture of a possible communication system according to an embodiment of this application.

FIG. 1 is a block diagram of a wireless communication system to which the embodiments of this application is applicable. The wireless communication system includes a terminal 11 and a network-side device 12. The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicular user equipment (VUE), pedestrian user equipment (PUE), or smart-home appliance (a smart-home device having a wireless communication function, for example, a refrigerator, a television, a washing machine, or furniture). The wearable device includes a smart watch, a smart band, smart earphones, smart glasses, smart jewelry (a smart bracelet, a smart chain bracelet, a smart ring, a smart necklace, a smart anklet, a smart chain anklet, or the like), a smart wrist band, smart clothing, a game console, or the like. It should be noted that the terminal 11 is not limited to any type in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or another appropriate term in the art. Provided that the same technical effect is achieved, the base station is not limited to a technical term. It should be noted that the base station in the NR system is only used as an example in the embodiments of this application, but a type of the base station is not limited.

In an NR system, if sidelink SL discovery transmission is to be performed, multiplexing in NR SL communication (for example, a PSSCH) is required for the SL discovery, with no dedicated physical channel introduced. However, the resource allocation and multiplexing rules for SL discovery have not been standardized. Therefore, how effective multiplexing rules are formulated for data for SL discovery during SL discovery transmission is an urgent problem to be solved.

In view of the preceding problem, the embodiments of the application provide a data transmission method and a UE. The UE can distinguish transmission requirements of to-be-transmitted data according to data parameters of the to-be-transmitted data, so as to formulate appropriate resource allocation and multiplexing rules for the to-be-transmitted data, thereby ensuring the transmission performance of data for SL discovery and improving the energy efficiency of data transmission.

The following describes in detail the data transmission method and apparatus, UE, and non-transitory readable storage medium provided in the embodiments of this application by using some embodiments and application scenarios thereof with reference to the accompanying drawings.

Figure 2:
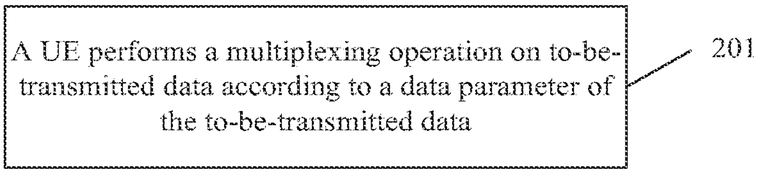
FIG. 2 is a first schematic flowchart of a data transmission method according to an embodiment of this application.

An embodiment of this application provides a data transmission method. As shown in FIG. 2, the data transmission method provided in this embodiment of this application may include the following step 201.

Step 201: UE performs a multiplexing operation on to-be-transmitted data according to a data parameter of the to-be-transmitted data.

The to-be-transmitted data includes at least one of the following: a first type of data or a second type of data, where the first type of data is data for sidelink SL discovery, and the second type of data is data for non-SL discovery.

In this embodiment of this application, the SL discovery refers to an SL discovery procedure. The non-SL discovery refers to a non-SL discovery procedure. In an embodiment, the SL discovery procedure can support two modes: model A and model B. In another embodiment, the SL discovery procedure can also support more modes.

It should be noted that the data for non-SL discovery can at least include at least one of the following: data for SL communication or data for SL relay communication.

For example, the SL relay communication procedure means a procedure of indirect forwarding of Uu services and/or signaling through SL; and the data for SL relay communication mainly refers to at least one of Uu unicast, groupcast, or broadcast service data. In addition, the data for SL relay communication may also include signaling related to a Uu service, for example, a system message and a paging message.

For example, the SL communication refers to a procedure of direct transmission of services and/or signaling through SL. The data for SL communication mainly refers to at least one of SL unicast, groupcast, or broadcast service data. In addition, the data for SL communication may also include signaling related to an SL service, for example, at least one of SL MAC CE, PC5 RRC, or PC5-S messages. It should be noted that PC5 RRC and PC5-S herein are mainly used for the establishment and maintenance of SL unicast connection, SL DRX configuration negotiation, SL UE assistance information transmission, and the like The SL MAC CE herein includes SL DRX MAC CE, SL CSI report MAC CE, and the like.

In the data transmission method provided in this embodiment of the application, the UE can distinguish transmission requirements of to-be-transmitted data according to data parameters of the to-be-transmitted data, so as to formulate appropriate multiplexing rules for the to-be-transmitted data, thereby ensuring the transmission performance of data for SL discovery and improving the energy efficiency of data transmission.

Optionally, in this embodiment of this application, before the foregoing step 201, the data transmission method provided in this embodiment of this application may include the following step 301.

Step 301: The UE obtains an SL grant.

The data parameter of the to-be-transmitted data includes a resource type of the SL grant. For example, the resource type of the SL grant may include any one of the following: a first type of resource, a second type of resource, and a third type of resource. The first type of resource is dedicated to SL discovery (also called SL discovery dedicated resource), the second type of resource is dedicated to non-SL discovery (also called SL communication dedicated resource), and the third type of resource is used for SL discovery and non-SL discovery (also called shared resource).

It should be noted that the resources mentioned in this application can also be resource pools. For example, the resource type of the SL grant may include any one of the following: a first type of resource pool, a second type of resource pool, and a third type of resource pool. The first type of resource pool is dedicated to SL discovery, the second type of resource pool is dedicated to non-SL discovery, and the third type of resource pool is used for SL discovery and non-SL discovery.

Optionally, in this embodiment of this application, in the foregoing step 201, the process that UE performs a multiplexing operation on to-be-transmitted data according to a data parameter of the to-be-transmitted data includes at least one of the following:

in a case that the resource type of the SL grant is the first type of resource and that the to-be-transmitted data includes the first type of data, the UE selects the first type of data in the to-be-transmitted data for the multiplexing operation;

in a case that the resource type of the SL grant is the second type of resource and that the to-be-transmitted data includes the second type of data, the UE selects the second type of data in the to-be-transmitted data for the multiplexing operation; or in a case that the resource type of the SL grant is the third type of resource and that the to-be-transmitted data includes the first type of data and/or the second type of data, the UE selects the first type of data and/or the second type of data in the to-be-transmitted data for the multiplexing operation.

For example, the UE determines the resource type currently used by the to-be-transmitted data, and determines, according to the resource type, whether the to-be-transmitted data is multiplexed in one TB for transmission. For example, if the resource type currently used by the to-be-transmitted data is "shared resource", the UE performs the multiplexing operation on SL discovery and non-SL discovery types of data; otherwise, the UE does not perform the multiplexing operation on SL discovery and non-SL discovery types of data.

For example, under the premise that "UE does not perform a multiplexing operation on NR SL discovery and non-SL discovery types of data", if the resource type of the to-be-transmitted data is "SL discovery dedicated resource", UE performs the multiplexing operation on only the SL discovery type of data; and if the resource type of the current to-be-transmitted data is "SL communication dedicated resource", the UE performs the multiplexing operation on only the non-NR SL discovery type of data.

Optionally, in this embodiment of this application, after the foregoing step 301, the data transmission method provided in this embodiment of this application may include the following step 302.

Step 302: In a case that the resource type of the SL grant is the first type of resource and that the to-be-transmitted data does not include the first type of data, or in a case that the resource type of the SL grant is the second type of resource and that the to-be-transmitted data does not include the second type of data, or in a case that the resource type of the SL grant is the third type of resource and that the to-be-transmitted data does not include the first type of data and the second type of data, the UE discards the SL grant.

In some possible embodiments, if the UE discards the foregoing SL grant, the UE may further perform at least one of the following operations:

triggering, by the UE, a resource reselection operation; or reporting, by the UE, to a network-side device that the SL grant has been discarded.

Optionally, in this embodiment of this application, the data parameter of the to-be-transmitted data includes a priority corresponding to each type of data in the to-be-transmitted data.

In some possible embodiments, the to-be-transmitted data is divided into two groups for comparison.

For example, in a case that the to-be-transmitted data includes the first type of data and the second type of data, in the foregoing step 201, the process that "UE performs a multiplexing operation on to-be-transmitted data according to a data parameter of the to-be-transmitted data" includes any one of the following:

(1) if a first priority corresponding to the first type of data is higher than a second priority corresponding to the second type of data, the UE selects the first type of data in the to-be-transmitted data for the multiplexing operation; otherwise, the UE selects the second type of data in the to-be-transmitted data for the multiplexing operation; and (2) if a first priority corresponding to the first type of data is lower than a second priority corresponding to the second type of data, the UE selects the second type of data in the to-be-transmitted data for the multiplexing operation; otherwise, the UE selects the first type of data in the to-be-transmitted data for the multiplexing operation; where the first priority is determined based on a highest priority in at least one logical channel priority of the first type of data; and the second priority is determined based on a highest priority in at least one logical channel priority of the second type of data.

In some possible embodiments, for the first point above, in this scenario, if the first priority is higher than the second priority, the UE preferentially selects the first type of data in the to-be-transmitted data for the multiplexing operation; otherwise, if the first priority is equal to the second priority, the UE may preferentially select the second type of data in the to-be-transmitted data for the multiplexing operation.

In some possible embodiments, for the second point above, in this scenario, if the first priority is lower than the second priority, the UE preferentially selects the second type of data in the to-be-transmitted data for the multiplexing operation; otherwise, if the first priority is equal to the second priority, the UE may preferentially select the first type of data in the to-be-transmitted data for the multiplexing operation.

In some possible embodiments, the to-be-transmitted data is divided into three groups for comparison. For example, the second type of data includes at least one of the following: a third type of data or a fourth type of data; where the third type of data includes data for SL communication, and the fourth type of data includes data for SL relay communication.

In some possible embodiments, a priority corresponding to the first type of data is a first priority, the first priority being determined based on a highest priority in at least one logical channel priority of the first type of data; a priority corresponding to the data for SL communication is a third priority, the third priority being determined based on a highest priority in at least one logical channel priority of the data for SL communication; and a priority corresponding to the data for SL relay communication is a fourth priority, the fourth priority being determined based on a highest priority in at least one logical channel priority of the data for SL relay communication.

In the foregoing step 201, the process that "UE performs a multiplexing operation on to-be-transmitted data according to a data parameter of the to-be-transmitted data" includes any one of the following:

(1) if the first priority corresponding to the first type of data is higher than or equal to the third priority and the fourth priority, the UE selects the first type of data in the to-be-transmitted data for the multiplexing operation;

(2) if the third priority is higher than or equal to the first priority corresponding to the first type of data and the fourth priority, the UE selects the third type of data in the to-be-transmitted data for the multiplexing operation; and (3) if the fourth priority is higher than or equal to the first priority corresponding to the first type of data and the third priority, the UE selects the fourth type of data in the to-be-transmitted data for the multiplexing operation.

In some possible embodiments, the SL discovery and non-SL discovery types of data are never multiplexed in one TB. In this case, the UE can compare priorities of different types of data in the current to-be-transmitted data, and select a type of data with a highest priority to perform a multiplexing operation on the data of the corresponding data type.

In some possible embodiments, the current to-be-transmitted data can be divided into two groups for comparison. For example, "a priority corresponding to the SL discovery type of data (for example, priority of a logical channel)" is compared with a highest priority in "at least one of a priority corresponding to the data for SL communication, a priority corresponding to the data for PC5 RRC, or a priority corresponding to the data for SL MAC CE", and if the former has the highest priority, the SL discovery type of data is multiplexed; otherwise, the non-NR SL discovery type of data is multiplexed.

In an example, the embodiments of the application do not limit whether the non-NR SL discovery type of data can be multiplexed.

In some possible embodiments, the current to-be-transmitted data can be divided into three groups for comparison. For example, for the highest priority in "a priority corresponding to an SL discovery type of data (for example, priority of a logical channel)", "a priority corresponding to data for SL communication and/or a priority corresponding to data for SL MAC CE", and "a priority corresponding to data for PC5 RRC", if a priority corresponding to a first group is the highest priority, the multiplexing operation is performed on an NR SL discovery type of data; if a priority corresponding to a second group is the highest priority, the multiplexing operation is performed on the data for NR SL communication and/or SL MAC CE; and if a priority corresponding to a third group is the highest priority, the multiplexing operation is performed on the data for PC5 RRC.

In an example, because PC5 RRC signaling used by relay UE to forward a Uu system message and a Uu paging message to remote UE may be sent in a groupcast or broadcast mode, and a protocol stipulates that it is sent in an RLC TM mode, it can be agreed that this type of PC5 RRC signaling can be sent separately without being multiplexed with other types of data.

Figure 3:
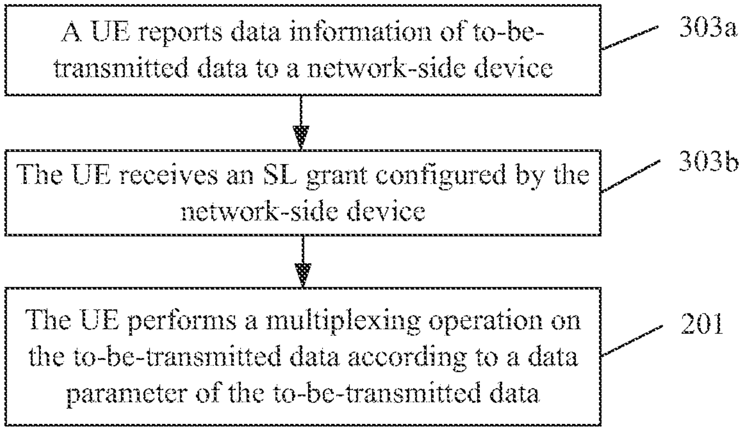
FIG. 3 is a second schematic flowchart of a data transmission method according to an embodiment of this application.

Optionally, in this embodiment of this application, as shown in FIG. 2 and FIG. 3, before the foregoing step 201, the data transmission method provided in this embodiment of this application may include the following steps 303*a* and 303*b*.

Step 303*a*: The UE reports data information of the to-be-transmitted data to a network-side device.

Step 303*b*: The UE receives the SL grant configured by the network-side device.

For example, the scheme shown in FIG. 3 can be applied to UE working in a base station scheduling mode (mode 1).

Optionally, in this embodiment of this application, the UE can assist its serving base station to distinguish transmission requirements from SL discovery and non-SL discovery types of data.

For example, before the foregoing step 201, the data transmission method provided in this embodiment of this application may include the following step 303*c*.

Step 303*c*: In a case that the to-be-transmitted data includes the first type of data and the second type of data and that the first type of data and the second type of data use the same destination ID, the UE associates the first type of data and the second type of data with different destination indexes.

The data information includes the destination ID, a destination index associated with the first type of data, and a destination index associated with the second type of data.

For example, the UE determines that the destination ID currently used by the to-be-transmitted data is destination L2 ID. If SL discovery and SL communication use the same destination L2 ID, the UE can report the destination L2 ID twice to the network-side device and associate it with different destination indexes (for example, index A and index B).

It should be noted that different destination indexes can be directly agreed in a protocol for indicating different data types. For example, index A is used to indicate the first type of data, and index B is used to indicate the second type of data. Certainly, an agreement may be made based on a reporting order, values of the destination indexes, or the like, which is not limited in the embodiments of this application.

Optionally, in this embodiment of this application, before the foregoing step 303*a*, the data transmission method provided in this embodiment of this application may include the following step 303*d*.

Step 303*d*: The UE calculates a buffer size of a logical channel group corresponding to the first type of data and a buffer size of a logical channel group corresponding to the second type of data.

The data information of the to-be-transmitted data includes the buffer size of the logical channel group corresponding to the first type of data and the buffer size of the logical channel group corresponding to the second type of data.

For example, the UE may report the SL BSR MAC CEs to the network-side device to respectively indicate buffer sizes of logical channel groups corresponding to different destination indexes.

For example, the network-side device determines resource allocation for the UE based on the data information of the to-be-transmitted data reported by the UE.

For example, during calculating the buffer size of to-be-transmitted data that corresponds to destination L2 ID, the UE distinguishes logical channels used by SL discovery and SL communication, and obtains, under the same destination L2 ID, a buffer size (for example, LCG=0, buffer size A) of a logical channel group corresponding to SL discovery, and a buffer size (LCG=1, buffer size B) of a logical channel group corresponding to SL communication. And then, the UE reports the SL BSR MAC CEs to a base station to respectively indicate the buffer sizes of the logical channel groups corresponding to the destination indexes. Finally, the base station obtains information of "whether the UE currently has a transmission requirement of NR SL discovery and a corresponding buffer size", and determines resource allocation for the UE based on the information.

For example, if index A is present in SL BSR MAC CE, it is concluded that "the UE currently has the transmission requirement of NR SL discovery"; and, if index B corresponds to a buffer size of a logical channel group, "a corresponding buffer size" can be obtained.

Figure 4:
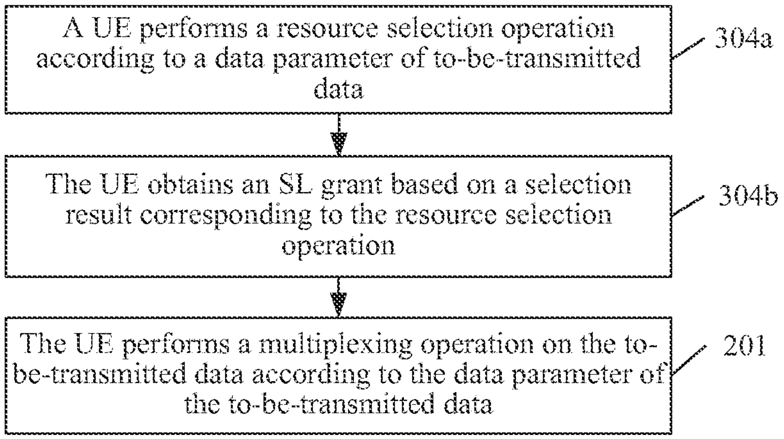
FIG. 4 is a third schematic flowchart of a data transmission method according to an embodiment of this application.

Optionally, in this embodiment of this application, as shown in FIG. 2 and FIG. 4, before the foregoing step 201, the data transmission method provided in this embodiment of this application may include the following steps 304*a* and 304*b*.

Step 304*a*: The UE performs a resource selection operation according to the data parameter of the to-be-transmitted data.

Step 304*b*: The UE obtains an SL grant based on a selection result corresponding to the resource selection operation.

Optionally, in this embodiment of this application, in a case that the data parameter of the to-be-transmitted data includes the resource type of the SL grant, the foregoing step 304*a* may include any one of the following:

in a case that the to-be-transmitted data includes only the first type of data, the UE excludes the second type of resource in the process of performing the resource selection operation (which may be replaced by another method, that is, the UE performs the resource selection operation with the first type of resource and/or the third type of resource as a candidate resource range); and in a case that the to-be-transmitted data only includes the second type of data, the UE excludes the first type of resource in the process of performing the resource selection operation (which may be replaced by another method, that is, the UE performs the resource selection operation with the second type of resource and/or the third type of resource as a candidate resource range).

Optionally, in this embodiment of this application, in a case that the data parameter of the to-be-transmitted data includes a priority corresponding to each type of data in the to-be-transmitted data, the foregoing step 304*a* may include any one of the following:

if the first priority corresponding to the first type of data is higher than the second priority corresponding to the second type of data, the UE excludes the second type of resource in the process of performing the resource selection operation (which may be replaced by another method, that is, the UE performs the resource selection operation with the first type of resource and/or the third type of resource as a candidate resource range); otherwise, the UE excludes the first type of resource in the process of performing the resource selection operation (which may be replaced by another method, that is, the UE performs the resource selection operation with the second type of resource and/or the third type of resource as a candidate resource range); and if the first priority corresponding to the first type of data is lower than the second priority corresponding to the second type of data, the UE excludes the first type of resource in the process of performing the resource selection operation (the same as above); otherwise, the UE excludes the second type of resource in the process of performing the resource selection operation (the same as above); where the first priority is determined based on a highest priority in at least one logical channel priority of the first type of data; and the second priority is determined based on a highest priority in at least one logical channel priority of the second type of data.

It should be noted that the data transmission method provided in the embodiments of this application may be performed by a data transmission apparatus or a control module for performing the data transmission method in the data transmission apparatus. In the embodiments of this application, the data transmission method being performed by a data transmission apparatus is used as an example for describing the data transmission apparatus provided in the embodiments of this application.

Figure 5:
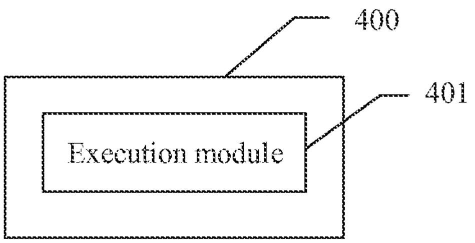
FIG. 5 is a first schematic structural diagram of a data transmission apparatus according to an embodiment of this application.

An embodiment of this application provides a data transmission apparatus. As shown in FIG. 5, the data transmission apparatus provided in this embodiment of this application may include an execution module 401.

The execution module 401 is configured to perform a multiplexing operation on to-be-transmitted data according to a data parameter of the data the to-be-transmitted data, where the to-be-transmitted data includes at least one of the following: a first type of data or a second type of data, the first type of data being data for sidelink SL discovery, and the second type of data being data for non-SL discovery.

Figure 6:
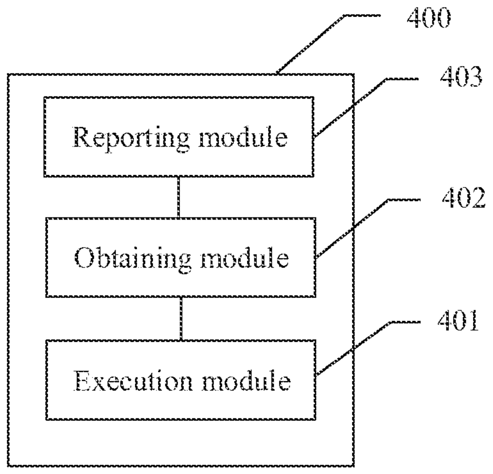
FIG. 6 is a second schematic structural diagram of a data transmission apparatus according to an embodiment of this application.

In some possible embodiments, as shown in FIG. 6, the data transmission apparatus 400 further includes an obtaining module 402, where the obtaining module 402 is configured to obtain an SL grant; where the data parameter of the to-be-transmitted data includes a resource type of the SL grant, and the resource type of the SL grant includes any one of the following: a first type of resource, a second type of resource, and a third type of resource; the first type of resource being used for the SL discovery, the second type of resource being used for the non-SL discovery, and the third type of resource being used for the SL discovery and the non-SL discovery.

In some possible embodiments, the first execution module 401 is configured to perform at least one of the following:

in a case that the resource type of the SL grant is the first type of resource and that the to-be-transmitted data includes the first type of data, selecting the first type of data in the to-be-transmitted data for the multiplexing operation;

in a case that the resource type of the SL grant is the second type of resource and that the to-be-transmitted data includes the second type of data, selecting the second type of data in the to-be-transmitted data for the multiplexing operation; or in a case that the resource type of the SL grant is the third type of resource and that the to-be-transmitted data includes the first type of data and/or the second type of data, selecting, the first type of data and/or the second type of data in the to-be-transmitted data for the multiplexing operation.

In some possible embodiments, the execution module 401 is further configured to:

in a case that the resource type of the SL grant is the first type of resource and that the to-be-transmitted data does not include the first type of data, or in a case that the resource type of the SL grant is the second type of resource and that the to-be-transmitted data does not include the second type of data, or in a case that the resource type of the SL grant is the third type of resource and that the to-be-transmitted data does not include the first type of data and the second type of data, discard the SL grant.

In some possible embodiments, the execution module 401 is further configured to: if the SL grant is discarded, perform at least one of the following operations: triggering a resource reselection operation; or reporting to the network-side device that the SL grant has been discarded.

In some possible embodiments, the data parameter of the to-be-transmitted data includes a priority corresponding to each type of data in the to-be-transmitted data.

In some possible embodiments, the execution module 401 is configured to: in a case that the to-be-transmitted data includes the first type of data and the second type of data, perform any one of the following:

if a first priority corresponding to the first type of data is higher than a second priority corresponding to the second type of data, selecting the first type of data in the to-be-transmitted data for the multiplexing operation; otherwise, selecting the second type of data in the to-be-transmitted data for the multiplexing operation; and if a first priority corresponding to the first type of data is lower than a second priority corresponding to the second type of data, selecting the second type of data in the to-be-transmitted data for the multiplexing operation; otherwise, selecting the first type of data in the to-be-transmitted data for the multiplexing operation; where the first priority is determined based on a highest priority in at least one logical channel priority of the first type of data; and the second priority is determined based on a highest priority in at least one logical channel priority of the second type of data.

In some possible embodiments, the second type of data includes at least one of the following: a third type of data or a fourth type of data; where the third type of data includes data for SL communication, and the fourth type of data includes data for SL relay communication.

In some possible embodiments, a priority corresponding to the first type of data is a first priority, the first priority being determined based on a highest priority in at least one logical channel priority of the first type of data; a priority corresponding to the data for SL communication is a third priority, the third priority being determined based on a highest priority in at least one logical channel priority of the data for SL communication; and a priority corresponding to the data for SL relay communication is a fourth priority, the fourth priority being determined based on a highest priority in at least one logical channel priority of the data for SL relay communication; and the execution module 401 is configured to perform any of the following:

if the first priority is higher than or equal to the third priority and the fourth priority, selecting the first type of data in the to-be-transmitted data for the multiplexing operation;

if the third priority is higher than or equal to the first priority and the fourth priority, selecting the third type of data in the to-be-transmitted data for the multiplexing operation; and if the fourth priority is higher than or equal to the first priority and the third priority, selecting the fourth type of data in the to-be-transmitted data for the multiplexing operation.

In some possible embodiments, as shown in FIG. 6, the data transmission apparatus 400 further includes a reporting module 403, where the reporting module 403 is configured to report data information of the to-be-transmitted data to a network-side device; and the obtaining module 402 is configured to receive an SL grant configured by the network-side device.

In some possible embodiments, the execution module 401 is further configured to: in a case that the to-be-transmitted data includes the first type of data and the second type of data and that the first type of data and the second type of data use the same destination ID, associate the first type of data and the second type of data with different destination indexes; where the data information includes the destination ID, a destination index associated with the first type of data, and a destination index associated with the second type of data.

In some possible embodiments, the execution module 401 is further configured to calculate a buffer size of a logical channel group corresponding to the first type of data and a buffer size of a logical channel group corresponding to the second type of data; where the data information includes the buffer size of the logical channel group corresponding to the first type of data and the buffer size of the logical channel group corresponding to the second type of data.

In some possible embodiments, the execution module 401 is further configured to perform a resource selection operation according to the data parameter of the to-be-transmitted data; and the obtaining module 402 is configured to obtain the SL grant based on a selection result corresponding to the resource selection operation.

In some possible embodiments, the data parameter of the to-be-transmitted data includes the resource type of the SL grant; and the execution module 401 is configured to perform any one of the following:

in a case that the to-be-transmitted data includes only the first type of data, excluding the second type of resource in the process of performing the resource selection operation; and in a case that the to-be-transmitted data includes only the second type of data, excluding the first type of resource in the process of performing the resource selection operation.

In some possible embodiments, the data parameter of the to-be-transmitted data includes a priority corresponding to each type of data in the to-be-transmitted data, and the execution module 401 is configured to perform any one of the following:

if the first priority corresponding to the first type of data is higher than the second priority corresponding to the second type of data, excluding the second type of resource in the process of performing the resource selection operation; otherwise, excluding the first type of resource in the process of performing the resource selection operation; and if the first priority corresponding to the first type of data is lower than the second priority corresponding to the second type of data, excluding the first type of resource in the process of performing the resource selection operation; otherwise, excluding the second type of resource in the process of performing the resource selection operation; where the first priority is determined based on a highest priority in at least one logical channel priority of the first type of data; and the second priority is determined based on a highest priority in at least one logical channel priority of the second type of data.

The data transmission apparatus provided in this embodiment of the application can distinguish transmission requirements of to-be-transmitted data according to data parameters of the to-be-transmitted data, so as to formulate appropriate multiplexing rules for the to-be-transmitted data, thereby ensuring the transmission performance of data for SL discovery and improving the energy efficiency of data transmission.

The data transmission apparatus in this embodiment of this application may be an apparatus, an apparatus or electronic device with an operating system, or a component, integrated circuit, or chip in a terminal. The apparatus or electronic device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine or the like, which are not limited in the embodiments of this application.

The data transmission apparatus provided in this embodiment of this application can implement each process implemented by the method embodiments in FIG. 2 and FIG. 4, with the same technical effect achieved. To avoid repetition, details are not described herein again.

Figure 7:
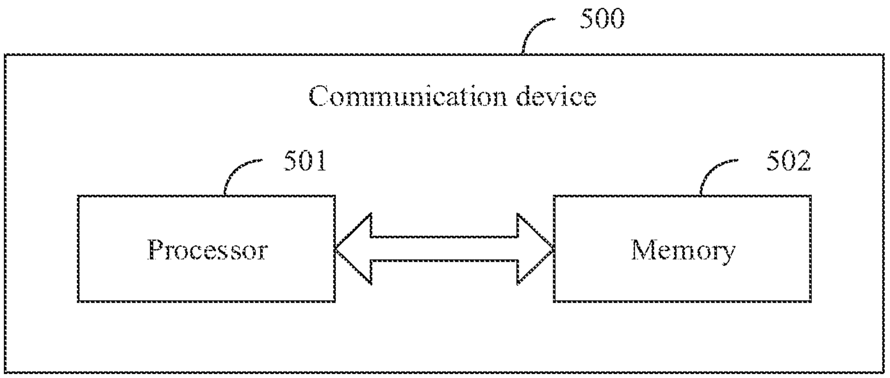
FIG. 7 is a schematic diagram of a hardware structure of a communication device according to an embodiment of this application.

Optionally, as shown in FIG. 7, an embodiment of this application further provides a communication device 500 including a processor 501, a memory 502, and a program or instructions stored in the memory 502 and executable on the processor 501. For example, in a case that the communication device 500 is a terminal, when the program or the instructions are executed by the processor 501, the processes of the foregoing embodiment of the data transmission method are implemented, with the same technical effects achieved.

Figure 8:
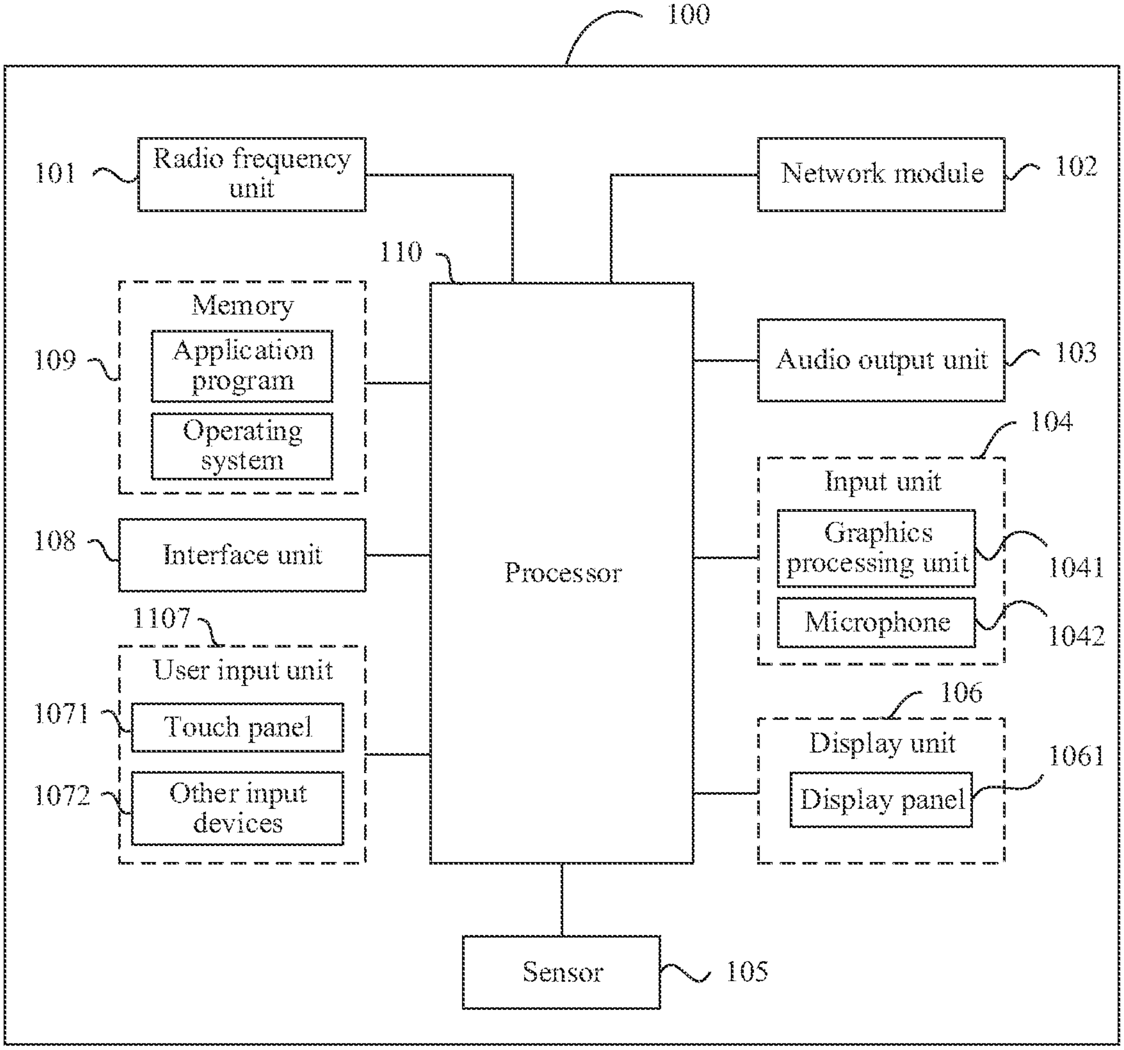
FIG. 8 is a schematic diagram of a hardware structure of a terminal according to an embodiment of this application.

An embodiment of the application further provides UE including a processor and a communication interface. The processor is configured to perform a multiplexing operation on to-be-transmitted data according to a data parameter of the to-be-transmitted data; where the to-be-transmitted data includes at least one of the following: a first type of data or a second type of data, the first type of data being data for sidelink SL discovery, and the second type of data being data for non-SL discovery. This UE embodiment corresponds to the foregoing method embodiment on the UE side. All processes and implementations in the foregoing method embodiment may be applicable to this terminal embodiment, with the same technical effect achieved. Optionally, UE being a terminal is used as an example. FIG. 8 is a schematic diagram of a hardware structure of a terminal for implementing embodiments of this application.

The terminal 100 includes, but is not limited to, at least some of components such as a radio frequency unit 101, a network module 102, an audio output unit 103, an input unit 104, a sensor 105, a display unit 106, a user input unit 107, an interface unit 108, a memory 109, and a processor 110.

It can be understood by those skilled in the art that the terminal 100 may further include a power supply (for example, a battery) supplying power to the components. The power supply may be logically connected to the processor 110 via a power management system, so that functions such as charge management, discharge management, and power consumption management are implemented by using the power management system. The structure of the terminal shown in FIG. 8 does not constitute any limitation on the terminal, and the terminal may include more or fewer components than shown in the figure, or combine some of the components, or have different arrangements of the components. Details are not described herein.

It should be understood that in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061. The display panel 1061 may be configured in a form of a liquid crystal display, an organic light-emitting diode display, or the like. The user input unit 107 includes a touch panel 1071 and other input devices 1072. The touch panel 1071 is also referred to as a touch-screen. The touch panel 1071 may include two parts: a touch detection apparatus and a touch controller. The other input devices 1072 may include, but are not limited to a physical keyboard, a function button (for example, a volume control button or a power button), a trackball, a mouse, and a joystick. Details are not described herein.

In this embodiment of this application, the radio frequency unit 101 transmits downlink data received from a network-side device to the processor 110 for processing, and in addition, transmits uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may mainly include a program or instruction storage area and a data storage area. The program or instruction storage area may store an operating system, an application program or instructions required by at least one function (for example, a sound playback function or an image playback function), and the like. The memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, flash memory device, or other volatile solid-state storage device.

The processor 110 may include one or more processing units. Optionally, the processor 110 may integrate an application processor and a modem processor. The application processor mainly processes an operating system, a user interface, application programs or instructions, and the like. The modem processor mainly processes radio communication, for example, being a baseband processor. It can be understood that the modem processor may alternatively be not integrated in the processor 110.

The processor 110 is configured to perform a multiplexing operation on to-be-transmitted data according to a data parameter of the data the to-be-transmitted data, where the to-be-transmitted data includes at least one of the following: a first type of data or a second type of data, the first type of data being data for sidelink SL discovery, and the second type of data being data for non-SL discovery.

In some possible embodiments, the processor 110 is configured to obtain an SL grant; where the data parameter of the to-be-transmitted data includes a resource type of the SL grant, and the resource type of the SL grant includes any one of the following: a first type of resource, a second type of resource, and a third type of resource; the first type of resource being dedicated to the SL discovery, the second type of resource being dedicated to the non-SL discovery, and the third type of resource being used for the SL discovery and the non-SL discovery.

In some possible embodiments, the processor 110 is configured to perform at least one of the following:

in a case that the resource type of the SL grant is the first type of resource and that the to-be-transmitted data includes the first type of data, selecting the first type of data in the to-be-transmitted data for the multiplexing operation;

in a case that the resource type of the SL grant is the second type of resource and that the to-be-transmitted data includes the second type of data, selecting the second type of data in the to-be-transmitted data for the multiplexing operation; or in a case that the resource type of the SL grant is the third type of resource and that the to-be-transmitted data includes the first type of data and/or the second type of data, selecting the first type of data and/or the second type of data in the to-be-transmitted data for the multiplexing operation.

In some possible embodiments, the processor 110 is further configured to:

in a case that the resource type of the SL grant is the first type of resource and that the to-be-transmitted data does not include the first type of data, or in a case that the resource type of the SL grant is the second type of resource and that the to-be-transmitted data does not include the second type of data, or in a case that the resource type of the SL grant is the third type of resource and that the to-be-transmitted data does not include the first type of data and the second type of data, discard the SL grant.

In some possible embodiments, the processor 110 is further configured to: if the SL grant is discarded, perform at least one of the following operations: triggering a resource reselection operation; or reporting to the network-side device that the SL grant has been discarded.

In some possible embodiments, the data parameter of the to-be-transmitted data includes a priority corresponding to each type of data in the to-be-transmitted data.

In some possible embodiments, the processor 110 is configured to: in a case that the to-be-transmitted data includes the first type of data and the second type of data, perform any one of the following:

if a first priority corresponding to the first type of data is higher than a second priority corresponding to the second type of data, selecting the first type of data in the to-be-transmitted data for the multiplexing operation; otherwise, selecting the second type of data in the to-be-transmitted data for the multiplexing operation; and if a first priority corresponding to the first type of data is lower than a second priority corresponding to the second type of data, selecting the second type of data in the to-be-transmitted data for the multiplexing operation; otherwise, selecting the first type of data in the to-be-transmitted data for the multiplexing operation; where the first priority is determined based on a highest priority in at least one logical channel priority of the first type of data; and the second priority is determined based on a highest priority in at least one logical channel priority of the second type of data.

In some possible embodiments, the second type of data includes at least one of the following: a third type of data or a fourth type of data; where the third type of data includes data for SL communication, and the fourth type of data includes data for SL relay communication.

In some possible embodiments, a priority corresponding to the first type of data is a first priority, the first priority being determined based on a highest priority in at least one logical channel priority of the first type of data; a priority corresponding to the data for SL communication is a third priority, the third priority being determined based on a highest priority in at least one logical channel priority of the data for SL communication; and a priority corresponding to the data for SL relay communication is a fourth priority, the fourth priority being determined based on a highest priority in at least one logical channel priority of the data for SL relay communication; and the processor 110 is configured to perform any of the following:

if the first priority is higher than or equal to the third priority and the fourth priority, selecting the first type of data in the to-be-transmitted data for the multiplexing operation;

if the third priority is higher than or equal to the first priority and the fourth priority, selecting the third type of data in the to-be-transmitted data for the multiplexing operation; and if the fourth priority is higher than or equal to the first priority and the third priority, selecting the fourth type of data in the to-be-transmitted data for the multiplexing operation.

In some possible embodiments, the radio frequency unit 101 is configured to report data information of the to-be-transmitted data to a network-side device; and the processor 110 is configured to receive the SL grant configured by the network-side device.

In some possible embodiments, the processor 110 is further configured to: in a case that the to-be-transmitted data includes the first type of data and the second type of data and that the first type of data and the second type of data use the same destination ID, associate the first type of data and the second type of data with different destination indexes; where the data information includes the destination ID, a destination index associated with the first type of data, and a destination index associated with the second type of data.

In some possible embodiments, the processor 110 is further configured to calculate a buffer size of a logical channel group corresponding to the first type of data and a buffer size of a logical channel group corresponding to the second type of data; where the data information includes the buffer size of the logical channel group corresponding to the first type of data and the buffer size of the logical channel group corresponding to the second type of data.

In some possible embodiments, the processor 110 is further configured to perform a resource selection operation according to the data parameter of the to-be-transmitted data; and the processor 110 is configured to obtain the SL grant based on a selection result corresponding to the resource selection operation.

In some possible embodiments, the data parameter of the to-be-transmitted data includes the resource type of the SL grant; and the processor 110 is configured to perform any one of the following:

in a case that the to-be-transmitted data includes only the first type of data, excluding the second type of resource in the process of performing the resource selection operation; and in a case that the to-be-transmitted data includes only the second type of data, excluding the first type of resource in the process of performing the resource selection operation.

In some possible embodiments, the data parameter of the to-be-transmitted data includes a priority corresponding to each type of data in the to-be-transmitted data, and the processor 110 is configured to perform any one of the following:

if the first priority corresponding to the first type of data is higher than the second priority corresponding to the second type of data, excluding the second type of resource in the process of performing the resource selection operation; otherwise, excluding the first type of resource in the process of performing the resource selection operation; and if the first priority corresponding to the first type of data is lower than the second priority corresponding to the second type of data, excluding the first type of resource in the process of performing the resource selection operation; otherwise, excluding the second type of resource in the process of performing the resource selection operation; where the first priority is determined based on a highest priority in at least one logical channel priority of the first type of data; and the second priority is determined based on a highest priority in at least one logical channel priority of the second type of data.

In the terminal provided in this embodiment of the application, the terminal can distinguish transmission requirements of to-be-transmitted data according to data parameters of the to-be-transmitted data, so as to formulate appropriate multiplexing rules for the to-be-transmitted data, thereby ensuring the transmission performance of data for SL discovery and improving the energy efficiency of data transmission.

An embodiment of this application further provides a non-transitory readable storage medium. The non-transitory readable storage medium stores a program or instructions, and when the program or instructions are executed by a processor, the processes of the foregoing embodiments of the data transmission method are implemented, with the same technical effects achieved. To avoid repetition, details are not described herein again.

The processor is the processor in the terminal in the foregoing embodiment. The non-transitory readable storage medium includes a non-transitory computer-readable storage medium such as a computer read-only memory (ROM), a random access memory (RAM), a magnetic disk, or an optical disc.

In addition, an embodiment of this application provides a chip. The chip includes a processor and a communication interface. The communication interface is coupled to the processor. The processor is configured to run a program or instructions to implement each process of the foregoing embodiment of the data transmission method, with the same technical effect achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program/program product, where the computer program/program product is stored in a non-volatile storage medium, and the program/program product is executed by at least one processor to implement the processes of the foregoing embodiments of the data transmission method, with the same technical effects achieved. To avoid repetition, details are not described herein again.

It should be noted that in this specification, the terms “include” and “comprise”, or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by “includes a . . . ” does not preclude the existence of other identical elements in the process, method, article, or apparatus that includes the element. It should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. Based on such an understanding, the technical solutions of this application essentially or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A data transmission method, comprising:

performing, by a user equipment (UE), a multiplexing operation on to-be-transmitted data according to a data parameter of the to-be-transmitted data; wherein the to-be-transmitted data comprises at least one of following: a first type of data or a second type of data, the first type of data being data for sidelink (SL) discovery, and the second type of data being data for non-SL discovery;

wherein before the performing, by a UE, a multiplexing operation on to-be-transmitted data according to a data parameter of the to-be-transmitted data, the method further comprises:

obtaining, by the UE, an SL grant; wherein the data parameter comprises a resource type of the SL grant; and the resource type of the SL grant comprises any one of following: a first type of resource, a second type of resource, and a third type of resource; the first type of resource being dedicated to the SL discovery, the second type of resource being dedicated to the non-SL discovery, and the third type of resource being used for the SL discovery and the non-SL discovery.

2. The method according to claim 1, wherein the process of performing, by a UE, a multiplexing operation on to-be-transmitted data according to a data parameter of the to-be-transmitted data comprises at least one of following:

in a case that the resource type of the SL grant is the first type of resource and that the to-be-transmitted data comprises the first type of data, selecting, by the UE, the first type of data in the to-be-transmitted data for the multiplexing operation;

in a case that the resource type of the SL grant is the second type of resource and that the to-be-transmitted data comprises the second type of data, selecting, by the UE, the second type of data in the to-be-transmitted data for the multiplexing operation; or in a case that the resource type of the SL grant is the third type of resource and that the to-be-transmitted data comprises the first type of data and/or the second type of data, selecting, by the UE, the first type of data and/or the second type of data in the to-be-transmitted data for the multiplexing operation.

3. The method according to claim 1, wherein after the obtaining, by the UE, an SL grant, the method further comprises:

in a case that the resource type of the SL grant is the first type of resource and that the to-be-transmitted data does not comprise the first type of data, or in a case that the resource type of the SL grant is the second type of resource and that the to-be-transmitted data does not comprise the second type of data, or in a case that the resource type of the SL grant is the third type of resource and that the to-be-transmitted data does not comprise the first type of data and the second type of data, discarding, by the UE, the SL grant.

4. The method according to claim 3, wherein the method further comprises:

if the UE discards the SL grant, performing, by the UE, at least one of following operations:

triggering, by the UE, a resource reselection operation; or reporting, by the UE, to a network-side device that the SL grant has been discarded.

5. The method according to claim 1, wherein before the performing, by a UE, a multiplexing operation on to-be-transmitted data according to a data parameter of the to-be-transmitted data, the method further comprises:

reporting, by the UE, data information of the to-be-transmitted data to a network-side device; and the obtaining, by the UE, an SL grant comprises:

receiving, by the UE, the SL grant configured by the network-side device.

6. The method according to claim 5, wherein before the reporting, by the UE, data information of the to-be-transmitted data to a network-side device, the method further comprises:

in a case that the to-be-transmitted data comprises the first type of data and the second type of data and that the first type of data and the second type of data use a same destination ID, associating, by the UE, the first type of data and the second type of data with different destination indexes; wherein the data information comprises the destination ID, a destination index associated with the first type of data, and a destination index associated with the second type of data.

7. The method according to claim 5, wherein before the reporting, by the UE, data information of the to-be-transmitted data to a network-side device, the method further comprises:

calculating, by the UE, a buffer size of a logical channel group corresponding to the first type of data and a buffer size of a logical channel group corresponding to the second type of data; wherein the data information comprises the buffer size of the logical channel group corresponding to the first type of data and the buffer size of the logical channel group corresponding to the second type of data.

8. The method according to claim 1, wherein before the performing, by a UE, a multiplexing operation on to-be-transmitted data according to a data parameter of the to-be-transmitted data, the method further comprises:

performing, by the UE, a resource selection operation according to the data parameter of the to-be-transmitted data; and the obtaining, by the UE, an SL grant comprises:

obtaining, by the UE, the SL grant based on a selection result corresponding to the resource selection operation.

9. The method according to claim 8, wherein the data parameter comprises the resource type of the SL grant; and the performing, by the UE, a resource selection operation according to the data parameter of the to-be-transmitted data comprises any one of following:

in a case that the to-be-transmitted data comprises only the first type of data, excluding, by the UE, the second type of resource in the process of performing the resource selection operation; and in a case that the to-be-transmitted data comprises only the second type of data, excluding, by the UE, the first type of resource in the process of performing the resource selection operation;

or, the data parameter comprises a priority corresponding to each type of data in the to-be-transmitted data; and the process of performing, by the UE, a resource selection operation according to the data parameter of the to-be-transmitted data comprises any one of following:

if a first priority corresponding to the first type of data is higher than a second priority corresponding to the second type of data, excluding, by the UE, the second type of resource in the process of performing the resource selection operation; otherwise, excluding, by the UE, the first type of resource in the process of performing the resource selection operation; and if the first priority corresponding to the first type of data is lower than the second priority corresponding to the second type of data, excluding, by the UE, the first type of resource in the process of performing the resource selection operation; otherwise, excluding, by the UE, the second type of resource in the process of performing the resource selection operation; wherein the first priority is determined based on a highest priority in at least one logical channel priority of the first type of data; and the second priority is determined based on a highest priority in at least one logical channel priority of the second type of data.

10. A user equipment (UE), comprising a processor, a memory, and a program or instructions stored in the memory and executable on the processor, wherein the program or the instructions, when executed by the processor, cause the UE to perform:

performing a multiplexing operation on to-be-transmitted data according to a data parameter of the to-be-transmitted data; wherein the to-be-transmitted data comprises at least one of following: a first type of data or a second type of data, the first type of data being data for sidelink (SL) discovery, and the second type of data being data for non-SL discovery;

wherein the program or the instructions, when executed by the processor, cause the UE to further perform:

obtaining an SL grant; wherein the data parameter comprises a resource type of the SL grant; and the resource type of the SL grant comprises any one of following: a first type of resource, a second type of resource, and a third type of resource; the first type of resource being dedicated to the SL discovery, the second type of resource being dedicated to the non-SL discovery, and the third type of resource being used for the SL discovery and the non-SL discovery.

11. The UE according to claim 10, wherein the program or the instructions, when executed by the processor, cause the UE to perform at least one of following:

in a case that the resource type of the SL grant is the first type of resource and that the to-be-transmitted data comprises the first type of data, selecting the first type of data in the to-be-transmitted data for the multiplexing operation;

in a case that the resource type of the SL grant is the second type of resource and that the to-be-transmitted data comprises the second type of data, selecting the second type of data in the to-be-transmitted data for the multiplexing operation; or in a case that the resource type of the SL grant is the third type of resource and that the to-be-transmitted data comprises the first type of data and/or the second type of data, selecting the first type of data and/or the second type of data in the to-be-transmitted data for the multiplexing operation.

12. The UE according to claim 10, wherein the program or the instructions, when executed by the processor, cause the UE to further perform:

in a case that the resource type of the SL grant is the first type of resource and that the to-be-transmitted data does not comprise the first type of data, or in a case that the resource type of the SL grant is the second type of resource and that the to-be-transmitted data does not comprise the second type of data, or in a case that the resource type of the SL grant is the third type of resource and that the to-be-transmitted data does not comprise the first type of data and the second type of data, discarding the SL grant;

if the UE discards the SL grant, the UE performs at least one of following operations:

triggering a resource reselection operation; or reporting to a network-side device that the SL grant has been discarded.

13. The UE according to claim 10, wherein the program or the instructions, when executed by the processor, cause the UE to further perform:

reporting data information of the to-be-transmitted data to a network-side device; and the program or the instructions, when executed by the processor, cause the UE to perform:

receiving the SL grant configured by the network-side device.

14. The UE according to claim 10, wherein the program or the instructions, when executed by the processor, cause the UE to further perform:

performing a resource selection operation according to the data parameter of the to-be-transmitted data; and the program or the instructions, when executed by the processor, cause the UE to perform:

obtaining the SL grant based on a selection result corresponding to the resource selection operation.

* * * * *